(12) United States Patent
Onders

(10) Patent No.: US 8,682,800 B2
(45) Date of Patent: Mar. 25, 2014

(54) CONTROLLING ACCESS TO TECHNOLOGY BASED UPON AUTHORIZATION

(75) Inventor: Timothy E. Onders, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1548 days.

(21) Appl. No.: 11/668,808

(22) Filed: Jan. 30, 2007

(65) Prior Publication Data

US 2008/0183625 A1 Jul. 31, 2008

(51) Int. Cl.
*G06F 21/00* (2013.01)

(52) U.S. Cl.
USPC .......................................................... 705/59

(58) Field of Classification Search
USPC ..................................... 705/50–79
See application file for complete search history.

(56) References Cited

U.S. PATENT DOCUMENTS

| | | | | |
|---|---|---|---|---|
| 5,553,143 | A * | 9/1996 | Ross et al. ...................... | 705/59 |
| 5,724,425 | A * | 3/1998 | Chang et al. ..................... | 705/52 |
| 5,933,503 | A * | 8/1999 | Schell et al. ..................... | 713/189 |
| 5,953,419 | A * | 9/1999 | Lohstroh et al. ............... | 713/165 |
| 6,108,420 | A * | 8/2000 | Larose et al. ................... | 705/59 |
| 6,135,646 | A * | 10/2000 | Kahn et al. ..................... | 709/217 |
| 6,226,618 | B1 * | 5/2001 | Downs et al. ..................... | 705/1 |
| 6,658,568 | B1 * | 12/2003 | Ginter et al. ..................... | 713/193 |
| 6,738,900 | B1 * | 5/2004 | Hardjono et al. ............. | 713/156 |
| 7,143,443 | B2 * | 11/2006 | Song et al. ...................... | 726/29 |
| 7,194,759 | B1 * | 3/2007 | Chess et al. ..................... | 705/53 |
| 2002/0077988 | A1 * | 6/2002 | Sasaki et al. ..................... | 705/59 |
| 2002/0164035 | A1 * | 11/2002 | Yokota et al. ................. | 380/278 |
| 2003/0046566 | A1 * | 3/2003 | Holopainen ................... | 713/193 |
| 2004/0039916 | A1 * | 2/2004 | Aldis et al. ..................... | 713/177 |
| 2004/0054908 | A1 * | 3/2004 | Circenis et al. ............... | 713/176 |
| 2004/0088646 | A1 * | 5/2004 | Yeager et al. .................. | 715/500 |
| 2005/0216414 | A1 * | 9/2005 | Higuchi .......................... | 705/51 |
| 2007/0094505 | A1 * | 4/2007 | Futa et al. ...................... | 713/176 |
| 2008/0008316 | A1 * | 1/2008 | Pilipchuk ........................ | 380/45 |

OTHER PUBLICATIONS

White, "How Computers Work", Millennium Edition, 1999, Que Corporation, Indianapolis, IN, all pages.*
Derfler, "How Networks Work", Bestseller Edition, 1996, Ziff-Davis Press, Emeryville, CA, all pages.*
Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*

* cited by examiner

*Primary Examiner* — Jacob C. Coppola
(74) *Attorney, Agent, or Firm* — Aaron Chatterjee; Sade Fashokun; Micky Minhas

(57) ABSTRACT

Methods and systems are provided for facilitating control of access to technology to authorized parties. A licensor provides licensure information to an application developer that includes a private key and a license, the license including an application public key and an identifying mark associated with the licensor, e.g., a digital signature. The licensor additionally provides a licensor public key to an implementation developer. The application developer and the implementation developer subsequently write the received information into the respective application and implementation. At runtime, the application adds ephemeral data and an identifying mark associated with the application to the application license and forwards the marked extended application license to the implementation. The implementation then validates the ephemeral data, the licensor's identifying mark and the licensee's identifying mark. Once all information is validated, the marked extended application license is validated and the licensed application may expose the licensed technology to a user.

10 Claims, 4 Drawing Sheets

CONTROLLING ACCESS TO TECHNOLOGY BASED UPON AUTHORIZATION

BACKGROUND

With respect to technology in general, and to software technology in particular, it is often desirable to limit access to persons and/or entities having proper authorization, e.g., persons and/or entities having a valid license to the technology. When two components of a particular technology are utilized conjunctively to create a single user experience, for instance, when an implementation of the technology and an application exposing the technology to the user are both utilized, providing a secure validation technique to facilitate insurance of proper authorizations can be fairly easy if both components are provided by the same party (e.g., vendor). However, the mechanisms become more complex when the two components are developed by independent parties and/or if proper authorization needs to be granted by a third party.

For instance, suppose that a company licenses a technology used in software applications under the following license model: The implementation of the technology and the application exposing the technology to the user both must be licensed; the implementation and the application may be provided by different licensees; licensed applications are not to be utilized by unlicensed implementations; and licensed implementations are not to be utilized by unlicensed applications. The simple solution to facilitate insurance of proper authorizations according to this model would be for the application to validate to the implementation using a shared secret, e.g., the application may provide a password to the implementation which may then verify the password. The licensor of the technology, in this instance, would provide a list of passwords to the implementation licensee and a valid password to all application licensees that could be validated against the implementation licensee's list.

However, this solution is inadequate for a number of reasons. First, either the implementation must include a large list of passwords or a small number of passwords must be used by all possible applications. Second, if the password is intercepted as it is exchanged between the application and the implementation, it can be used by other non-licensed applications. Third, the licensor cannot issue additional passwords as the password(s) provided to the implementation licensee and the application licensee are written into the respective licensed implementation(s) and application(s).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to controlling access to technology and facilitating the limitation of such access to authorized parties. An authorized party, typically, is a party having a valid license to the technology in question. The licensor provides licensure information to an application developer that includes information for creating an identifying mark associated with an application, such identifying mark being capable of being validated, e.g., an application private key, and an application license. The application license includes, at least, information for validating an identifying mark associated with an application, e.g., an application public key, and an identifying mark associated with the licensor, e.g., an electronic or digital signature of the licensor. The licensor additionally provides information for validating an identifying mark associated with the licensor, e.g., a licensor public key, to an implementation developer, the corresponding information to create an identifying mark associated with the licensor which can be validated, e.g., the licensor private key, being held by the licensor. The application developer and the implementation developer subsequently write the received information into the respective application and implementation. At run time, the application adds ephemeral data and an identifying mark associated with the application to the application license and forwards the marked extended application license to the implementation. The implementation then validates the ephemeral data, the identifying mark associated with the licensor and the identifying mark associated with the application. Once all information is validated, the licensed application may expose the licensed technology to the user.

BRIEF DESCRIPTION OF THE DRAWINGS

The present invention is described in detail below with reference to the attached drawing figures, wherein.

DETAILED DESCRIPTION

Figure 1:
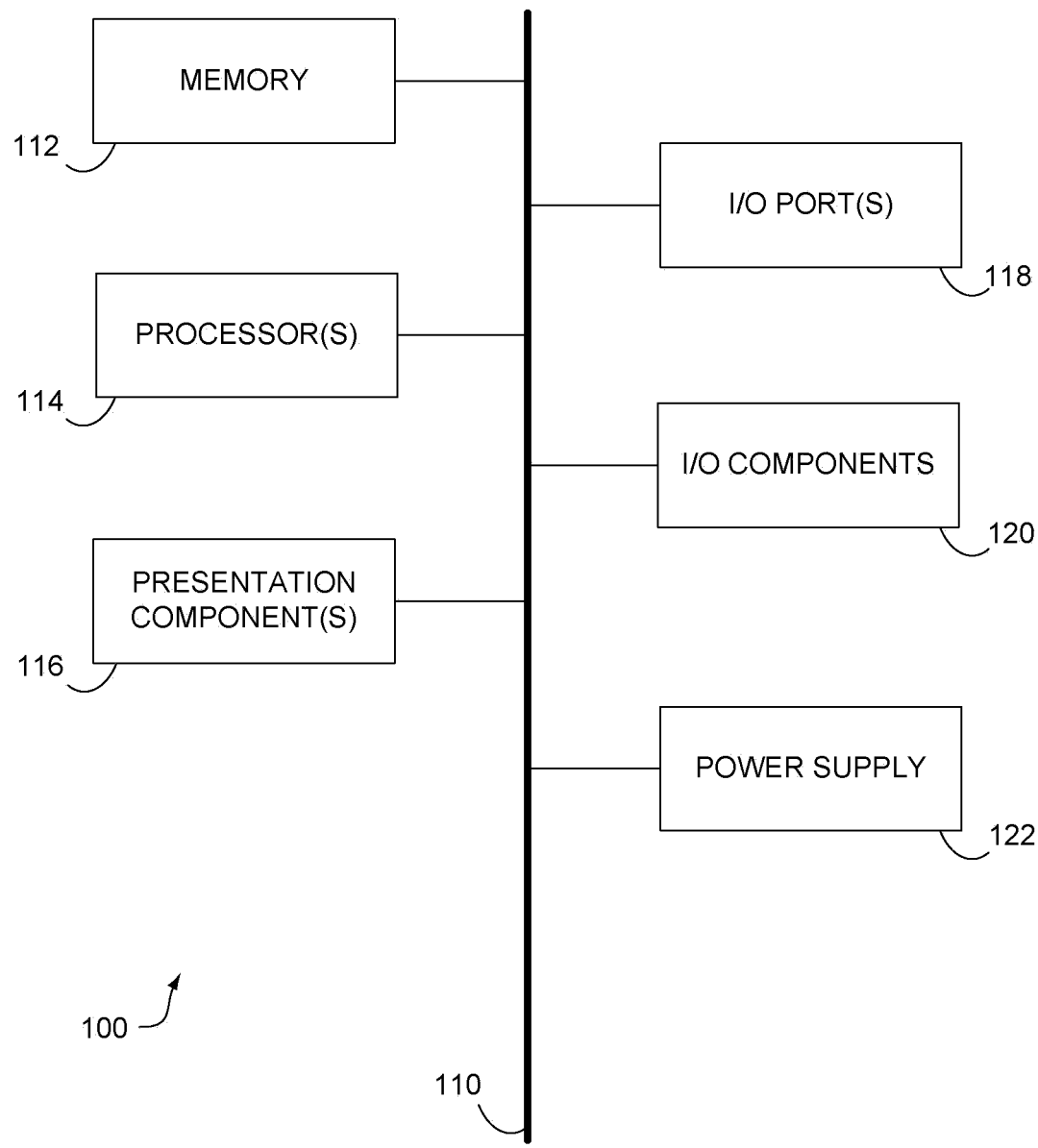
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide methods and systems for controlling access to technology and facilitating the limitation of such access to authorized, e.g., licensed, parties. In accordance with embodiments hereof, the licensor provides licensure information to an application developer that includes information for creating an identifying mark associated with an application, such identifying mark being capable of being validated, e.g., an application private key, and an application license. The application license includes, at least, information for validating an identifying mark associated with an application, e.g., an application public key, and an identifying mark associated with the licensor, e.g., an electronic or digital signature of the licensor. The licensor additionally provides information for validating an identifying mark associated with the licensor, e.g., a licensor public key, to an implementation developer. The application developer and the implementation developer subsequently write the received information into the respective application and implementation. At runtime, the application adds ephemeral data and an identifying mark associated with the application to the application license and forwards the marked extended application license to the implementation. The implementation then validates the ephemeral data, the identifying mark associated with the licensor and the identifying mark associated with the licensee. Once all information is validated, the marked extended application license is validated and the licensed application may expose the licensed technology to a user.

Accordingly, in one aspect, the present invention provides one or more computer-readable media having computer-executable instructions embodied thereon for performing a method for preparing a marked extended application license for validation. The method includes receiving, from a first party (e.g., a technology licensor) information for creating an identifying mark associated with a second party (e.g., an application licensee), such identifying mark being capable of being validated; receiving a license object from the first party, the license object including information for validating the identifying mark or signature associated with the second party and an identifying mark or signature associated with the first party; adding ephemeral data to at least a portion of the received license object to create an extended license; adding the identifying mark associated with the second party to the extended license to create a marked extended license; and forwarding the marked extended license to a third party, e.g., an implementation licensee, for validation.

In another aspect, the present invention provides one or more computer-readable media having computer-executable instructions embodied thereon for performing a method for validating a marked extended license. The method includes receiving a license object from a first party, e.g., a technology licensor, the license object including information for validating an identifying mark associated with the first party; receiving the marked extended license from a second party, e.g., an application licensee, the marked extended license including a license, ephemeral data, and an identifying mark associated with the second party; verifying the ephemeral data; validating the marked extended license as originating from the first party; and validating the identifying mark associated with the second party.

In a further aspect, the present invention provides a method for controlling access to technology based upon authorization. The method includes providing application authorization information to an application vendor, and providing implementation authorization information to an implementation vendor, wherein at least a portion of the application authorization information is configured to be modified through the addition of ephemeral data, and wherein the modified application authorization information is configured to be validated by the implementation vendor.

Having briefly described an overview of embodiments of the present invention, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
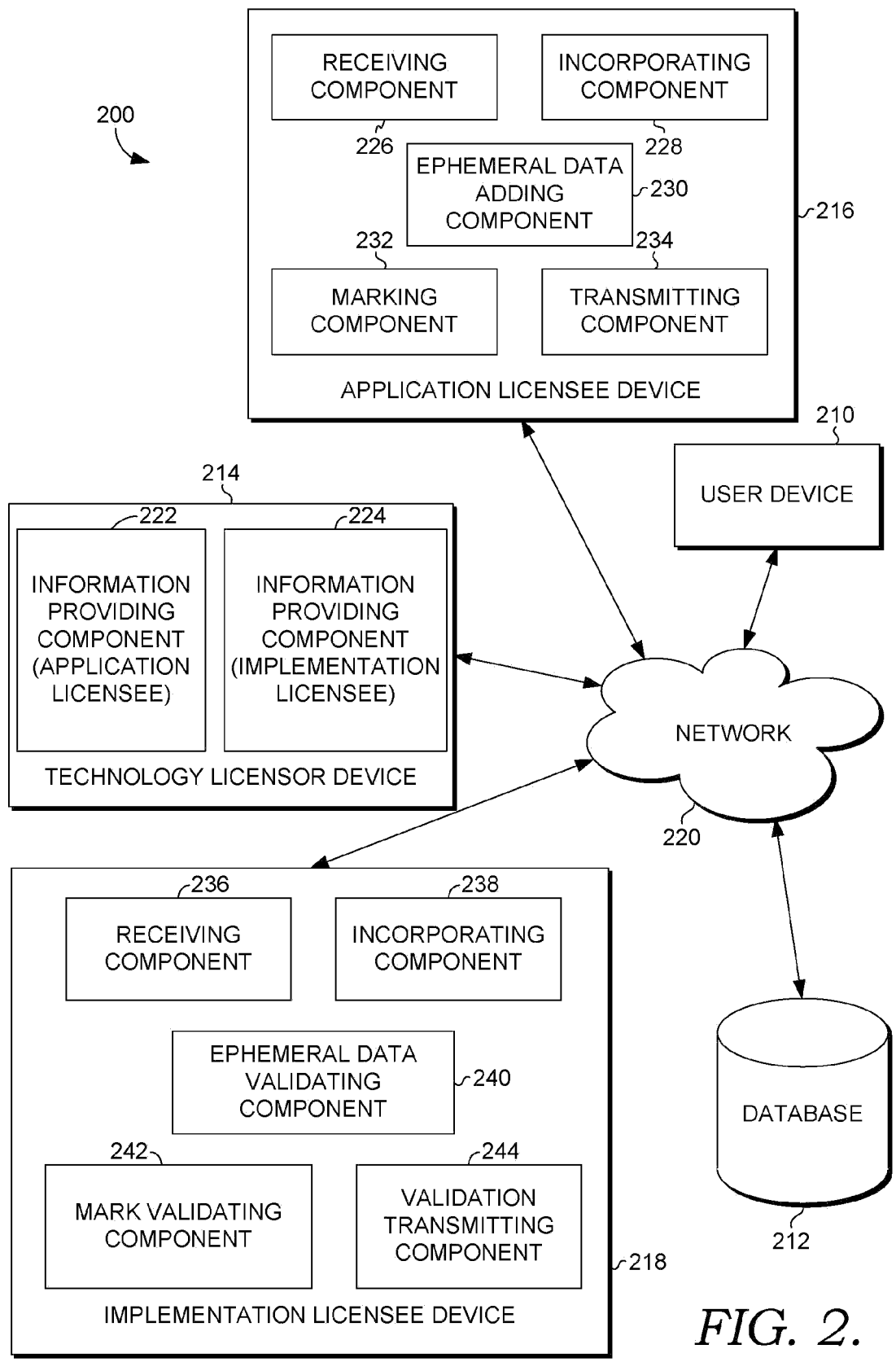
FIG. 2 is a block diagram of an exemplary computing system architecture suitable for use in implementing embodiments of the present invention.

Turning now to FIG. 2, a block diagram is illustrated that shows an exemplary computing system architecture 200 configured to facilitate control of access to licensed technology, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single component/module or combination of components/modules illustrated therein.

Computing system architecture 200 includes a user device 210, a database 212, a technology licensor device 214, an application licensee device 216 and a decoder or implementation licensee device 218, all in communication with one another via a network 220. The network 220 may include, without limitation, one or more local area networks (LANs) and/or wide area networks (WANs). Such networking environments are commonplace in offices, enterprise-wide computer networks, intranets, and the Internet. Accordingly, the network 220 is not further described herein.

The database 212 is configured to store information associated with at least one technology license. In various embodiments, such information may include, without limitation, one or more application licenses, one or more implementation licenses, information for validating identifying marks (e.g., one or more public keys), information for creating identifying marks which are capable of being validated (e.g., one or more private keys), one or more licensor identifying marks or signatures, one or more application licensee identifying marks or signatures, and the like. In embodiments, the database 212 is configured to be searchable for one or more of the items stored in association therewith. It will be understood and appreciated by those of ordinary skill in the art that the information stored in the database 212 may be configurable and may include any information relevant to a technology license, e.g., a software license. The content and volume of such information are not intended to limit the scope of embodiments of the present invention in any way. Further, though illustrated as a single, independent component, database 212 may, in fact, be a plurality of databases, for instance, a database cluster, portions of which may reside on the user device 210, the technology licensor device 214, the application licensee device 216, the implementation licensee device 218, another external computing device (not shown), and/or any combination thereof.

Each of the user device 210, the technology licensor device 214, the application licensee device 216, and the implementation licensee device 218 shown in FIG. 2 may be any type of computing device, such as, for example, computing device 100 described above with reference to FIG. 1. By way of example only and not limitation, each of the user device 210, the technology licensor device 214, the application licensee device 216, and/or the implementation licensee device 218 may be a personal computer, desktop computer, laptop computer, handheld device, mobile handset, consumer electronic device, or the like. It should be noted, however, that the present invention is not limited to implementation on such computing devices, but may be implemented on any of a variety of different types of computing devices within the scope of embodiments hereof.

As shown in FIG. 2, the technology licensor device 214 includes an information providing component for the application licensee 222 and an information providing component for the decoder or implementation licensee 224. In some embodiments, one or more of the components 222 and 224 may be implemented as stand-alone applications. In other embodiments, one or more of the components 222 and 224 may be integrated directly into the operating system of the technology licensor device 214 or the user device 210. It will be understood by those of ordinary skill in the art that the components 222 and 224 illustrated in FIG. 2 are exemplary in nature and in number and should not be construed as limiting. Any number of components may be employed to achieve the desired functionality within the scope of embodiments of the present invention.

The information providing component for the application licensee 222 is configured to provide information for creating an identifying mark associated with a licensed application (e.g., an encryption/decryption value known only to the technology licensor and the application licensee), such identifying mark being capable of being validated, and at least one application license object to an application vendor or developer having a valid application license to the licensor's technology. The application license object includes at least information for validating an identifying mark associated with the licensor (e.g., an encryption/decryption value permitting a message encrypted therewith to be decrypted only by a person or entity possessing a corresponding encryption/decryption value) and an identifying mark associated with the licensor (e.g., an electronic or digital signature) which permits a party possessing the information for validating the identifying mark associated with the licensor to verify that an application license object originated with the technology licensor. The application license may additionally contain other information related to the application license, for instance, embedded permissions, and the like.

The information providing component for the implementation licensee 224 is configured to provide at least one implementation license object to an implementation vendor or developer having a valid implementation license to the licensor's technology. The implementation license object includes information for validating an identifying mark associated with the licensor, e.g., a licensor public key. The licensor public key enables the implementation to verify that an application license received by it originated with the licensor, as more fully described below.

As shown in FIG. 2, the application licensee device 216 includes a receiving component 226, an incorporating component 228, an ephemeral data adding component 230, a marking component 232, and a transmitting component 234. In some embodiments, one or more of the components 226, 228, 230, 232, and 234 may be implemented as stand-alone applications. In other embodiments, one or more of the components 226, 228, 230, 232, and 234 may be integrated directly into the operating system of the application licensee device 216 or the user device 210. It will be understood by those of ordinary skill in the art that the components 226, 228, 230, 232, and 234 illustrated in FIG. 2 are exemplary in nature and in number and should not be construed as limiting. Any number of components may be employed to achieve the desired functionality within the scope of embodiments of the present invention.

The receiving component 226 is configured to receive information for creating an identifying mark associated with a second party, e.g., an application licensee, and at least one license object (as described hereinabove with regard to information providing component 222) from a technology licensor. The incorporating component 228 is configured to incorporate the information for creating an identifying mark associated with the application (e.g., the private key) and the license provided in association with the received license object into the application. Such incorporation prepares the application to handle the exchange of information between the application and the implementation, as more fully described below.

The ephemeral data adding component 230 is configured to add a piece of ephemeral data (e.g., a time stamp or machine signature that has a limited lifetime based on, for instance, time, place, temperature, device configuration, or another non-static characteristic) to the license to create an extended license. This addition provides a limited lifetime to the data that is being exchanged between the application licensee and the implementation licensee, as more fully described below.

The marking component 232 is configured to add an identifying mark associated with the second party (e.g., an electronic or digital signature of the application licensee) to the extended application license utilizing the application private key. The marked extended license thus becomes a secured object.

The transmitting component 234 is configured to forward the marked extended license to another party, for instance, an implementation licensee, such as implementation licensee device 218.

As shown in FIG. 2, the decoder or implementation licensee device 218 includes a receiving component 236, an incorporating component 238, an ephemeral data validating component 240, a mark validating component 242, and a validation transmitting component 244. In some embodiments, one or more of the components 236, 238, 240, 242, and 244 may be implemented as stand-alone applications. In other embodiments, one or more of the components 236, 238, 240, 242, and 244 may be integrated directly into the operating system of the decoder licensee device 218 or the user device 210. It will be understood by those of ordinary skill in the art that the components 236, 238, 240, 242, and 244 illustrated in FIG. 2 are exemplary in nature and in number and should not be construed as limiting. Any number of components may be employed to achieve the desired functionality within the scope of embodiments of the present invention.

The receiving component 236 is configured to receive at least one implementation license object (as described hereinabove with regard to information providing component 224) from a technology licensor. The receiving component 236 is further configured to receive at least one marked extended license, e.g., from an application licensee device.

The incorporating component 238 is configured to incorporate the information for validating an identifying mark associated with the first party (e.g., the licensor public key) provided in association with the received implementation license object into the implementation. Such incorporation enables the implementation to validate that a marked extended license received from another party, for instance, an application licensee device, such as application licensee device 216, originated from the licensor, as more fully described below.

The ephemeral data validating component 240 is configured to validate ephemeral data associated with the received marked extended license. That is, the ephemeral data validating component 240 is configured to insure that the ephemeral data has not expired or otherwise been made invalid.

The mark validating component 242 is configured to validate that the marked extended license originated with the technology licensor. Thus, the mark validating component 242 is configured to validate that the marked extended license bears the identifying mark of the licensor (e.g., the licensor's electronic or digital signature). The mark validating component 242 is further configured to validate that the marked extended license was received from a licensed application. Such validations are made possible through the incorporation of the licensor public key into the implementation by, for instance, incorporating component 238, and the incorporation of the application public key into the application by, for instance, incorporating component 228 of the application licensee device 216.

The validation transmitting component 244 is configured to transmit a validation message to a user device, e.g., user device 210. If all information is validated, upon such transmission, a user at the user device will have access to the licensed technology. If, however, one or more items of information cannot be validated, user access to the licensed technology will be denied. In embodiments, a validation error may be presented at the user device.

Figure 3:
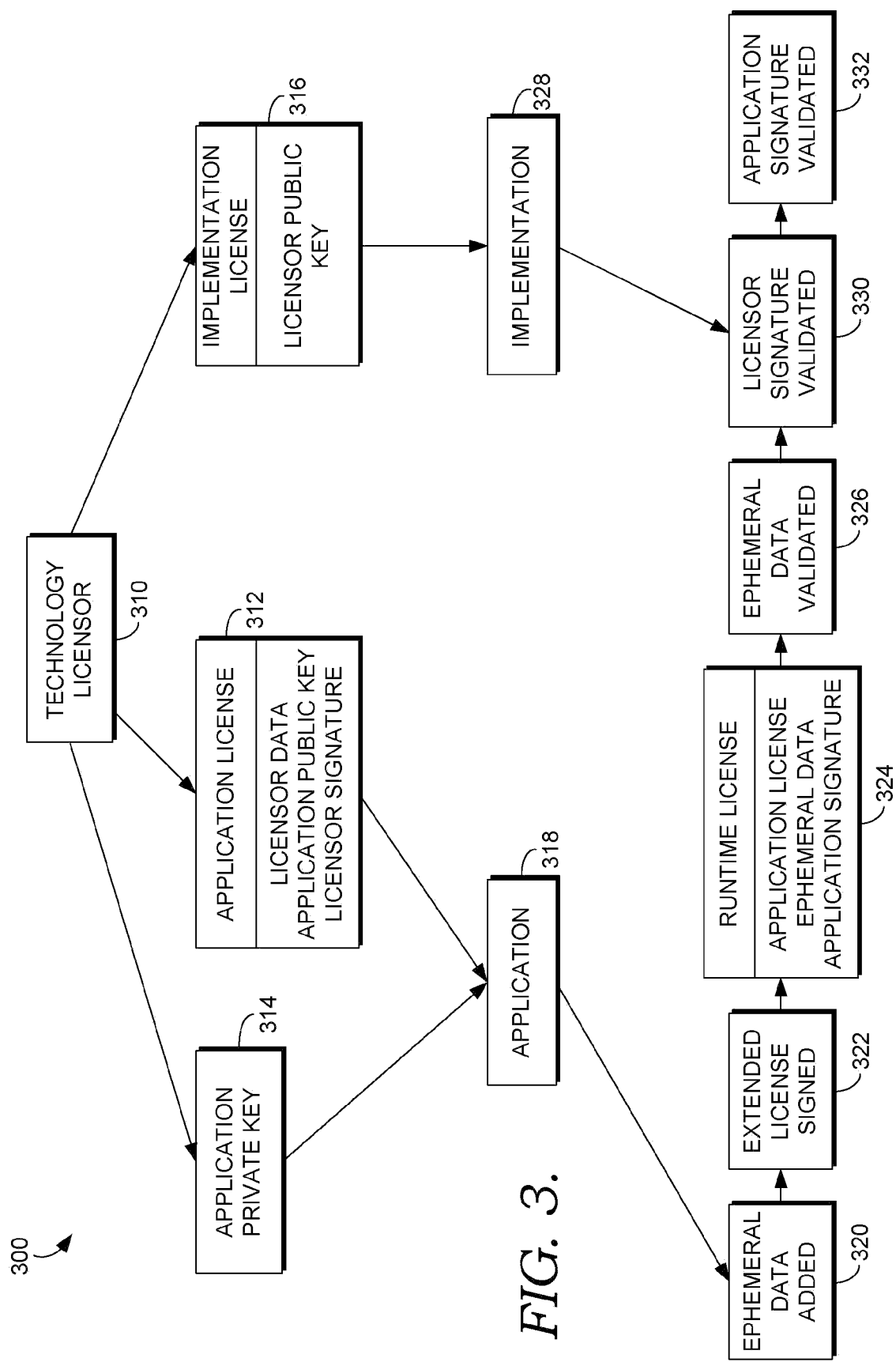
FIG. 3 is a block diagram illustrating an overall authorization and validation process involving three independent parties, in accordance with an embodiment of the present invention.

Turning now to FIG. 3, a block diagram illustrating the overall authorization and validation process, in accordance with an embodiment of the present invention, is shown and designated generally as reference numeral 300. Initially, a technology licensor 310 provides an application license 312 and an application private key 314 to an authorized application vendor, that is, a vendor having a valid license for one of its applications to the licensed technology. The application license 312 shown in FIG. 3 includes the application public key, the licensor's identifying mark or signature, and additional licensor data associated therewith. The technology licensor also provides an implementation or decoder license 316 to an authorized implementation vendor, that is, a vendor having a valid license for one of its implementations to the licensed technology. The implementation license 316 shown in FIG. 3 includes the licensor public key, the corresponding private key being held by the licensor.

Upon receiving the application license and private key, the application vendor incorporates the associated information into its licensed application, as shown at block 318. Similarly, upon receiving the implementation or decoder license, the implementation vendor incorporates the information associated with the licensor public key into its licensed implementation.

At runtime, the application adds ephemeral data to the application license, as indicated at block 320, to create an extended license. Subsequently, the application utilizes the information associated with the application private key to add an identifying mark indicative of the licensed application and/or the application vendor to the extended license. This is indicated at block 322. In this way, a marked extended application license, or runtime license 324, including the license, ephemeral data, and application mark or signature is created.

Subsequently, the runtime license is transmitted to the implementation wherein the ephemeral data is validated, as indicated at block 326. Also validated are the licensor mark or signature, as indicated at block 330, and the application mark or signature, as indicated at block 332. If all appropriate items of information are validated by the implementation, the application is validated. Subsequently, the implementation may transmit a validation message (or error message if validation fails) to a user device, e.g., user device 210 of FIG. 2. If validation is successful, a user at the user device will be permitted access to the licensed technology.

Figures 4, 5:
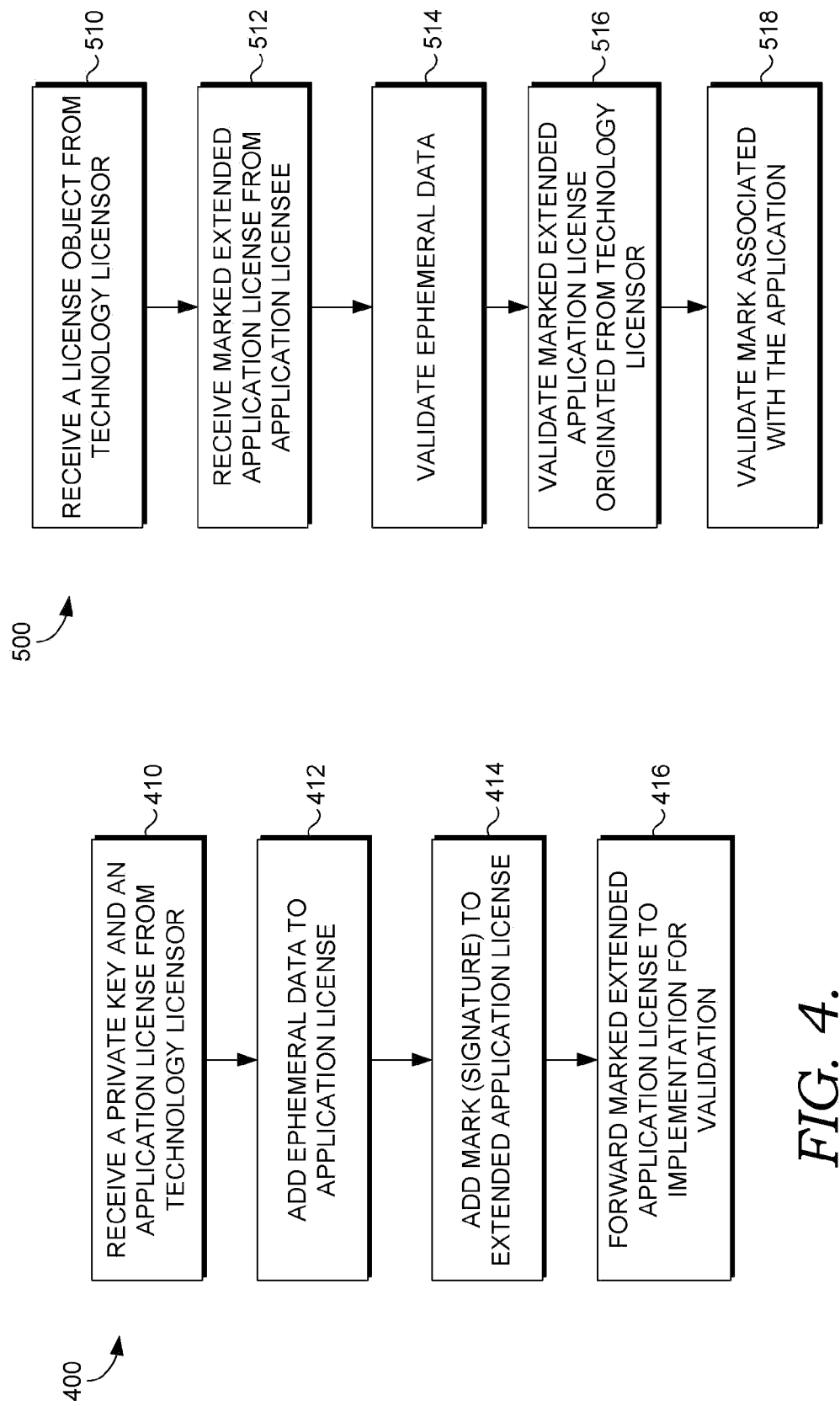
FIG. 4 is a flow diagram showing a method for use by a licensed application for preparing a marked extended application license and forwarding the same to a licensed implementation for validation, in accordance with an embodiment of the present invention.
FIG. 5 is a flow diagram showing a method for use by a licensed implementation for validating a marked extended application license, in accordance with an embodiment of the present invention.

With reference to FIG. 4, a flow diagram is shown illustrating a method 400, for use, e.g., by an application licensee, for preparing a marked extended application license for transmission to another party, e.g., an implementation licensee, for validation, in accordance with an embodiment of the present invention. Initially, as indicated at block 410, an application private key and an application license object are received from the technology licensor, e.g., utilizing receiving component 226 of FIG. 2. As previously mentioned, the license object may include an application license including an application public key, the licensor's electronic/digital signature, and/or additional information relevant to the application license. Subsequently, ephemeral data is added to the application license, as indicated at block 412, to create an extended application license, e.g., utilizing ephemeral data adding component 230 of FIG. 2. As previously mentioned, such ephemeral data may include, without limitation, a time stamp, machine hash, or any other data specifically designed to expire with the expiration of an identifiable non-static characteristic.

Next, as indicated at block 414, the mark associated with the application (e.g., electronic/digital signature) is added to the extended application license, for instance, utilizing marking component 232 of FIG. 2. Subsequently, the marked extended application license is forwarded, e.g., utilizing transmitting component 234 of FIG. 2, to a decoder or implementation for validation of the ephemeral data, the mark associated with the licensor and the mark associated with the licensee. This is indicated at block 416.

Turning now to FIG. 5, a flow diagram is shown illustrating a method 500 for use, for instance, by a decoder or implementation vendor, for validating a marked extended application license, in accordance with an embodiment of the present invention. Initially, as indicated at block 510, a license object is received from a technology licensor, e.g., utilizing receiving component 236 of FIG. 2. The license object received by the decoder vendor includes, at least, the information for validating an identifying mark associated with the technology licensor, e.g., a licensor public key. Subsequently, as indicated at block 512, a marked extended application license is received from an application licensee, e.g., by receiving component 236 of FIG. 2. Next, ephemeral data added to the application license by the application licensee is validated, as indicated at block 514, e.g., utilizing ephemeral data validating component 240 of FIG. 2. By way of example only, validation of the ephemeral data may include validating that a time associated with the added ephemeral data has not expired.

Subsequently, as indicated at block 516, it is validated that the marked extended application license originated from the technology licensor, e.g., utilizing mark validating component 242 of FIG. 2. Such validation includes, by way of example only, validating the licensor's electronic/digital signature utilizing the received public key. Subsequently, previously, or simultaneously, as indicated at block 518, the mark or signature associated with the application licensee is validated. Once the mark associated with the application licensee has been validated, the marked extended application license is validated and may be transmitted, e.g., utilizing validation transmitting component 244 of FIG. 2, to a user device, for instance, user device 210 of FIG. 2. If all validations are successful, a user at the user device, will subsequently be allowed access to the licensed technology.

As can be understood, embodiments of the present invention provide methods and systems (and computer-readable having computer-executable instructions embodied thereon for performing the methods herein described) for controlling access to technology and facilitating the limitation of such access to authorized, e.g., licensed, parties. In accordance with embodiments hereof, the licensor provides an application private key and an application license to an application developer. The application license includes, at least, an application public key and an identifying mark associated with the licensor, e.g., an electronic or digital signature of the licensor. The licensor additionally provides the licensor public key to an implementation developer, the corresponding private key being held by the licensor. The application developer and the implementation developer subsequently write the received information into the respective application and implementation. At run time, the application adds ephemeral data and an identifying mark of the application to the application license and forwards the marked extended application license to the implementation. The implementation then validates the ephemeral data, the identifying mark associated with the licensor and the identifying mark associated with the licensee. Once all information is validated, the marked extended application license is validated and the licensed application may expose the licensed technology to a user.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage memory media having computer-executable instructions embodied thereon that, when executed by a processor of a second party, causes the processor to perform a method for preparing a marked extended license for validation, the method comprising:
   receiving, from a first party, an application private key for creating an identifying mark associated with the second party, the identifying mark being capable of being validated;
   receiving a license object from the first party, the license object including a license, an application public key for validating the identifying mark associated with the second party, and an identifying mark associated with the first party;
   incorporating at least a portion of the license object into an application, wherein the at least a portion of the license object comprises the license;
   adding ephemeral data to the incorporated at least a portion of the license object to create an extended license, wherein the ephemeral data comprises data that expires after a period of time;
   adding the identifying mark associated with the second party to the extended license to create a marked extended license; and
   forwarding the marked extended license to a third party for validation.

2. The one or more computer-storage memory media of claim 1, wherein the method further comprises incorporating the license object into an application prior to adding the ephemeral data, or incorporating the extended license into an application prior to adding the identifying mark.

3. The one or more computer-storage memory media of claim 1, wherein the identifying mark associated with the first party is an electronic signature of the first party, and wherein the electronic signature of the first party is configured to be validated.

4. The one or more computer-storage memory media of claim 1, wherein the identifying mark associated with the second party is an electronic signature of the second party.

5. The one or more computer-storage memory media of claim 1, wherein the license further includes at least one additional information item associated with the first party.

6. The one or more computer-storage memory media of claim 1, wherein the first party is a technology licensor, the second party is an application vendor and the third party is an implementation vendor.

7. One or more computer-storage memory media having computer-executable instructions embodied thereon that, when executed by a processor of a second party, causes the processor to perform a method for preparing a marked extended license for validation, the method comprising:
　receiving, from a first party, an application private key for creating an identifying mark associated with the second party;
　receiving, from the first party, a license object, the license object including a license, an application public key for validating the identifying mark associated with the second party, and an identifying mark associated with the first party;
　incorporating at least a portion of the license object into an application, wherein the at least a portion of the license object comprises the license;
　creating an extended license including the license, the application public key, the identifying mark associated with the first party, and ephemeral data comprising data that expires after a period of time, wherein creating the extended license includes adding the ephemeral data to the incorporated at least a portion of the license object;
　creating a marked extended license including the extended license and the identifying mark associated with the second party, the identifying mark associated with the second party being capable of being validated, wherein creating the marked extended license includes adding the identifying mark associated with the second party to the extended license; and
　forwarding the marked extended license to a third party for validation.

8. The one or more computer-storage memory media of claim 7, wherein the identifying mark associated with the first party is an electronic signature of the first party, and wherein the electronic signature of the first party is configured to be validated.

9. The one or more computer-storage memory media of claim 7, wherein receiving a license object from the first party, the license object including information for validating the identifying mark associated with the second party, comprises receiving a license object including an application public key.

10. The one or more computer-storage memory media of claim 7, wherein the license further includes at least one additional information item associated with the first party.

* * * * *